H. A. JENSEN.
CABLE COUPLING.
APPLICATION FILED NOV. 12, 1920.
1,394,019. Patented Oct. 18, 1921.
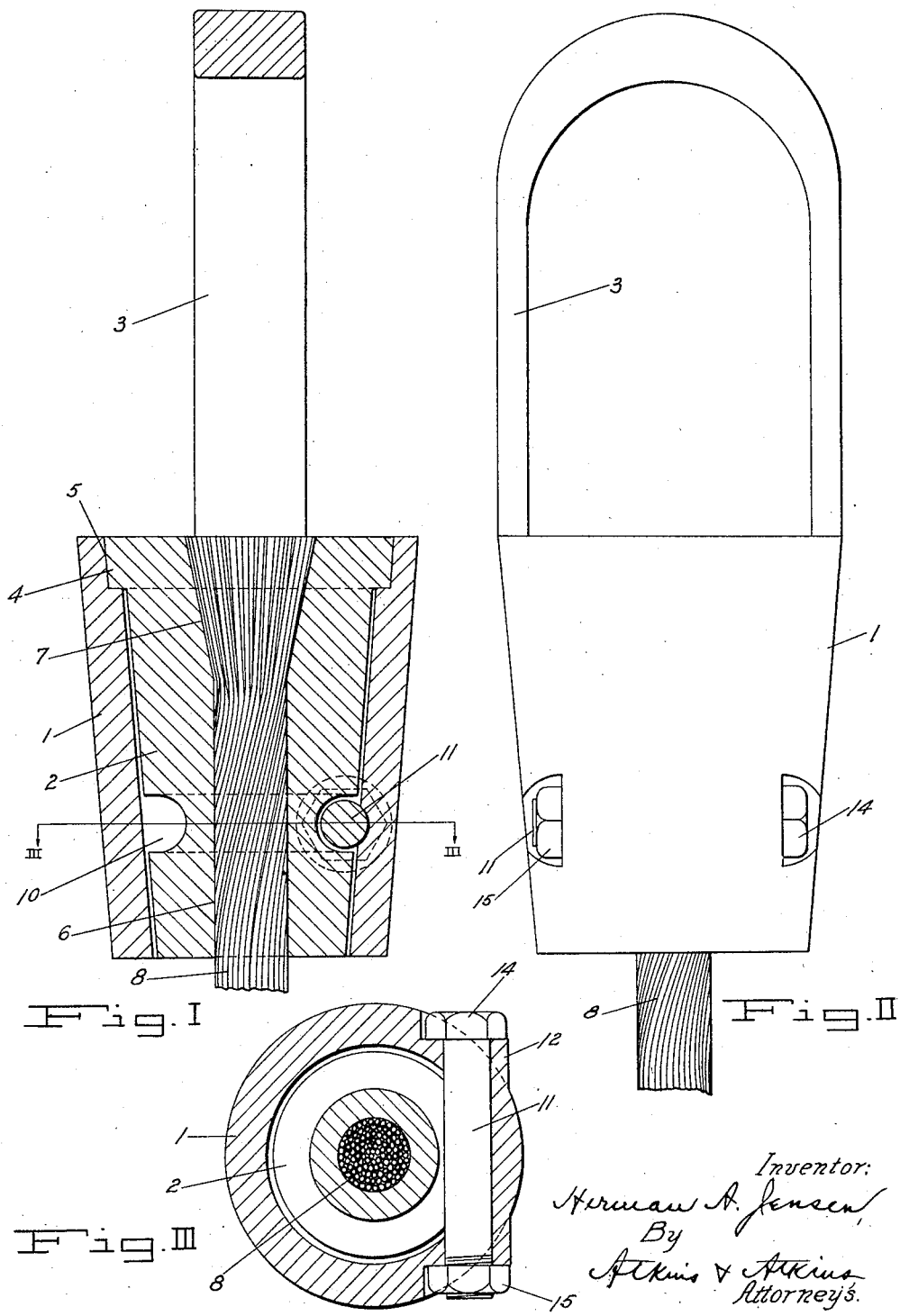
Inventor:
Herman A. Jensen,
By
Atkins & Atkins
Attorneys.

UNITED STATES PATENT OFFICE.

HERMAN A. JENSEN, OF CASTLE ROCK, WASHINGTON.

CABLE-COUPLING.

1,394,019.

Specification of Letters Patent. Patented Oct. 18, 1921.

Application filed November 12, 1920. Serial No. 423,719.

*To all whom it may concern:*

Be it known that I, HERMAN A. JENSEN, a citizen of the United States of America, and resident of Castle Rock, in the county of Cowlitz, in the State of Washington, have invented certain new and useful Improvements in Cable-Couplings, of which the following is a specification, reference being had to the accompanying drawing.

My invention relates to couplings for cables in which provision is made for attaching one part of a cable to another, or for attaching the cable to some other mechanical element, by aid of a socket swiveled thereto.

The object of my invention is to provide means for permitting freedom of movement in service of a cable under torsional strain, without either impairing the strength of the cable under tension, or interfering with its freedom of manipulation when tension is relieved.

What constitutes my invention will be hereinafter specified in detail and succinctly set forth in the appended claims.

In the accompanying drawing,

Figure I is a longitudinal vertical section, partially in elevation, of my invention in present preferred form of embodiment.

Fig. II is a side elevation of the subject matter of Fig. I, taken at right angles to the section shown in Fig. I.

Fig. III is a section on the line III—III as indicated by the arrows in Fig. I.

Referring to the numerals on the drawing, 1 indicates a socket-piece, and 2 a rotative head fitting with operative snugness within the same. The socket-piece 1 is provided with a preferably integral bail or link loop 3 by which it may be coupled to another cable or mechanical element after the manner of a chain link.

The head 2 is carried within the socket-piece 1 by an annular flange 4 which fits rotatively within an annular recess 5 provided for its reception in the interior wall of the socket-piece, the latter being provided with a tapered bore. The head 2 is correspondingly tapered, and the function of the flange 4 is to support those two parts in close juxtaposition, but without danger of their "freezing" or becoming jammed into close contact by a pull upon the head in the direction opposite to the bail 3.

The head 2 is preferably provided with an axially elongated aperture 6 flared at its upper end as indicated at 7, for the accommodation in the usual manner of a cable 8 whose expanded head is babbitted or otherwise secured into the flared aperture 7. In effect, the cable end and the head 2 are thus made one, so that when the head 2 is inserted into the socket-piece 1, the union of those elements affords, through mediation of the bail 3, secure means of uniting the cable to another member.

I am aware that it is old in the art to provide a cable with a head fixed thereto in a socket-piece. My invention consists in improving, and in facilitating the operation of, such a connection whereby the torsional strain upon the parts of the coupling occasioned by twist in the cable may find relief without impairment of the efficiency of the cable for service. To that end I provide, in connection with the socket-piece 1, head 2, and flange 4, as described, an annular groove 10 in the head 2 and a transverse retaining member, for example a pin or bolt 11, loosely passing through the same and extending, as through an aperture in a housing 12 provided for it, across the socket-piece 1, as shown, for example, in Fig. III. The member 11 is carried so as to hold the head 2 rotatively within the socket 1 but not so as to receive any of the strain that may be exerted through the cable 8 upon the head 2, that strain being carried wholly by engagement between the flange 4 and the walls of its recess 5. The member 11 is preferably a bolt provided at one end with a head 14, and at the other threaded to a nut 15.

The operation of my invention will be apparent to one skilled in the art from the foregoing specification, and appears to require no further description.

What I claim is:

1. A cable coupling consisting of the combination with a socket-piece, and a head adapted to be secured to the end of a cable, of an annular groove in the head, and a transverse retaining member in the socket-piece traversing the groove in the head and rotatively securing the head and socket-piece together.

2. A cable coupling consisting of the combination with a socket-piece, and a head revolubly united by an annular flange provided on the head and a corresponding recess provided in the socket-piece, of an annular groove in the head, and a transverse retaining member in the socket-piece traversing the groove in the head.

In testimony whereof, I have hereunto set my hand in the presence of two subscribing witnesses.

HERMAN A. JENSEN.

Witnesses:
R. M. GOODFELLOW,
RUDOLPH FINKAS.